Nov. 29, 1955 L. CONNELL 2,725,417

STEP-BY-STEP COORDINATE TYPE PRINTER AND TRANSMITTER THEREFOR

Filed Dec. 5, 1949 5 Sheets-Sheet 1

INVENTOR.
Lawrence Connell
BY [signature]
Atty.

Nov. 29, 1955 L. CONNELL 2,725,417

STEP-BY-STEP COORDINATE TYPE PRINTER AND TRANSMITTER THEREFOR

Filed Dec. 5, 1949 5 Sheets-Sheet 2

INVENTOR.
Lawrence Connell
BY
Atty.

Nov. 29, 1955

L. CONNELL 2,725,417

STEP-BY-STEP COORDINATE TYPE PRINTER AND TRANSMITTER THEREFOR

Filed Dec. 5, 1949

5 Sheets-Sheet 3

INVENTOR.
Lawrence Connell
BY McRamsey
Atty.

INVENTOR.
Lawrence Connell
BY [signature]
Atty.

Nov. 29, 1955 L. CONNELL 2,725,417

STEP-BY-STEP COORDINATE TYPE PRINTER AND TRANSMITTER THEREFOR

Filed Dec. 5, 1949 5 Sheets-Sheet 5

INVENTOR.
Lawrence Connell
BY [signature]
Atty.

United States Patent Office 2,725,417
Patented Nov. 29, 1955

2,725,417

STEP-BY-STEP COORDINATE TYPE PRINTER AND TRANSMITTER THEREFOR

Lawrence Connell, Portland, Oreg.

Application December 5, 1949, Serial No. 131,174
6 Claims. (Cl. 178—4)

My invention is designed to provide improved methods and means to facilitate the handling of ordinary telegraphing, and to provide for new fields and new types of operation.

My invention provides a step-by-step system with average signal lengths comparable to those of the presently used 5 unit printer systems for ordinary telegraph purposes and additional signals of any desired number for special purposes, in which the signals are composed of two parts or groups, each group consisting of one or more pulses of two elements, such as positive and negative, current and no current, etc., following each other in succession within the signals and between signals, and in which a terminal pulse, either the last or first pulse, of each group is prolonged, the signals being formed and determined by the relative number of pulses in the two groups constituting a signal.

With respect to new fields and new types of operation: The present widely used types of synchronized printers, while very efficient when operated over first class channels of communication, are not suited for operation over perhaps one third of the nation's present telegraph circuits, such as the so called "way" wires common to all railroads and usually jointly used by railroads and commercial telegraph companies for message traffic to and from small towns and cities. Circuits of this type may have up to 20 or more Morse relays in series with the line, presenting an electromagnetic inductance problem which is not being met and obviously cannot be met by the present day synchronous printer type of operation. My invention is especially useful in operation over such circuits, in addition to operation over first class circuits in a manner comparable with synchronized printers. Another feature of my invention is that it provides as many signals as desired in a very simple and practical manner, in contradistinction to the entirely impractical number of parts which would be required to operate any other system for similar purposes.

The superiority of step-by-step operation over synchronized operation is well understood; the difficulty encountered heretofore has been the inability to devise a step-by-step system for two element operation, without excessive signal lengths. The two element operation is the only kind that has proven practical over a general layout of circuits. In the step-by-step field the "ticker" systems, widely and successfully used, have employed a step-by-step transmission practically the same as mine, except that they utilize only one group of pulses in a signal and have signal lengths averaging 15 units and upward, which restricts the speed of operation to 25 to 35 words per minute. By splitting such signals into two groups and forming and determining them by the relation of the number of pulses in one group to the number in the second group, instead of by the actual number of pulses in the entire signal as in the "ticker" systems, I have reduced the average length of the signals for ordinary telegraph purposes by approximately one half for signals of otherwise precisely the same transmittable characteristics, and have therefore potentially doubled the operable speed of transmission of such signals from that standpoint alone. The devising of a two element step-by-step system of short average signal length for ordinary telegraphing and means for applying it constitute the major accomplishment of my invention, with other important advantages incidental to this accomplishment.

The incidental advantages are also believed to be very important. One is the combination of the abbreviated keyboard for transmission and its associated compact receiving type unit. Because my signals are each composed of two groups, each can be transmitted by striking two keys of the transmitting keyboard, or of a tape perforator, simultaneously, one key operating to select the transmission of the first part of a signal and the other key to select the transmission of the second part of the signal. This arrangement will reduce the speed of direct keyboard transmission, or of tape punching, but for small offices on "way" wires it would have a definite advantage of low cost, simplicity and upkeep, and would be fast enough to utilize the practical capacity of such circuits. Another potential value lies in the field of new types of operation, such as the transmission of foreign languages containing a comparatively large number of characters, and in the attainment of secrecy of transmission as a substitute for cipher. In these fields the slower transmitting keyboards would not be a drawback, as the speed attainable on them would be equal to or beyond the speed of transmission of the average signal lengths if a great number of signals were used. If 196 signals were desired, the sending or punching keyboard would use 14 keys for the left hand and 14 keys for the right hand, and the average signal length would be about 16 units, with an operating transmitting speed of 25 to 35 words per minute. If the system were extended to 30 keys for each hand it would provide 900 signals of approximately 30 units average length. 50 keys for each hand would provide 2500 signals of approximately 50 units average length. 100 keys for each hand would provide 10,000 signals of approximately 100 units length. The total signals attainable is the product of the number of keys for one hand multiplied by the number of keys for the other hand. The two groups do not have to be of equal number.

The operation of the system for secrecy of communication, as a substitute for military cipher is as follows: Assume 196 signals to be desired. The sending apparatus arrangement might have 14 keys for the left hand and 14 for the right hand. The receiving type unit would be 14 type units square. A letter frequency table would be consulted showing that A occurs approximately 16 times in 196 English letters, B occurs 3 times, C 6 times, and so on through the alphabet. Then a "key" list would be prepared listing and assigning 16 signals to the letter A, 3 signals to the letter B, 6 signals to the letter C, and so on through the entire alphabet. The type holder at the receiving end would be "set" to conform with the "key" list by placing an A type in each of the 16 signal positions shown on the list, a B type in each of the 3 signal positions shown on the list, a C type in each of the 6 signal positions shown on the list, and so on through the entire alphabet. The apparatus would then be ready to operate. The sending operator would transmit from a message written in English, and would transmit a different signal for each letter in accordance with the "key" list each time such letter occurred in the message. When and if all the signals assigned to any letter had been once used he would start using them over again, possibly in a different sequence. Obviously, any of the signals assigned to a particular letter would print that particular letter in English at the receiving end, so the message would be received in ordinary English. On the channel of communication where the message might be intercepted there would occur either no repetition of any signal, in a short message, or approximately the same repetition of all signals in a longer message, which in either case would provide no clews based on alphabetical frequency of letters and combinations of letters by which an interceptor might decipher the message. The "key" list could be changed when desired by notifying both sending and receiving stations. As stated above the expected speed for this example would be 25 to 35 words per minute. The saving in time ordinarily taken for enciphering and deciphering messages would be great, and the accuracy and safety of handling messages by this method would be far beyond that possible in the common handling of cipher, because errors could readily be detected in an English text at the receiving end while, in cipher, letters and text have no meaning to the receiving operator until the message has been deciphered.

One of the principal objects of my invention is to provide a telegraphic alphabet in which each signal is made up of plural groups of pulses, and each group comprises one or more related pulses of differing character. If plural pulses are utilized, they occur in alternating sequence and the pulses are of unit length. Each group is augmented by a prolongation. It may be at the beginning of each group, or it may be at the end of each group, but, of course, would have to be arranged uniformly throughout the signals. Said prolonged pulse is substantially greater than the unit length of the unit pulses, and indicates the beginning or end of a group of pulses in a signal and, also, the beginning or end of each signal making up a message.

A further object of my invention is to provide a method of transmitting telegraphic signals to promote secrecy and to inhibit the deciphering of said signals. This is accomplished by assigning to each letter of the alphabet a plurality of code designations corresponding generally to the letter frequency of the language used and varying the sequence in which said plural code designations are transmitted. In this way, deciphering cannot be done by utilizing known letter frequency or known letter combinations.

A further object of my invention is to provide sending and receiving apparatus in which the co-related sending keyboard and the printing mechanism at the receiver are so arranged that the signals may be grouped in coordinate fashion.

A further object of my invention is to provide electromagnetically operated selectors in connection with said coordinated sending keyboard and receiving mechanisms so that signals, made up in accordance with my invention, may be sent and received at high operating speed over telegraphic circuits.

Further and other details of my invention are hereinafter described with reference to the accompanying drawings, in which.

My two element code or alphabet comprises signals assigned to the separate letters of the alphabet, each signal comprising two groups; for example: each group comprising one or more pulses of predetermined length, pulses being alternately of different character, such as positive and negative or mark and space. I use the term mark and space for convenience of description, but do not wish to limit myself to current and no current as the sole difference in selected pulses. A signal might thus be said to comprise two groups, each comprising a mark and space element. For ordinary telegraph purposes, an alphabet is constructed by selecting, in accordance with frequency of use, the shortest signal for the most frequently used letter, including space between words, the next shortest for the next frequently used letter, etc., from the following table in which each vertical pair represents a signal comprising two groups of pulses:

First part: 1111111222222233333334444444555555566666667777777
Second part: 1234567123456712345671234567123456712345671234567

Assuming the last pulse of each part is the one to be prolonged, the transmission of the first vertical pair would be one prolonged pulse of mark or space followed by one prolonged pulse of the opposite element. The transmission of the last vertical pair would be a pulse of either mark or space, which we will assume to be mark, followed by a pulse of space, followed by a pulse of mark, then a pulse of space, then a pulse of a mark, then a pulse of a space, then a prolonged pulse of mark, then a pulse of space, a pulse of mark, a pulse of space, a pulse of mark, a pulse of space, a pulse of mark, a prolonged pulse of space.

If additional signals are necessary the above table would simply be extended by increasing the number of pulses in both first and second parts of the signals.

Figure 1:
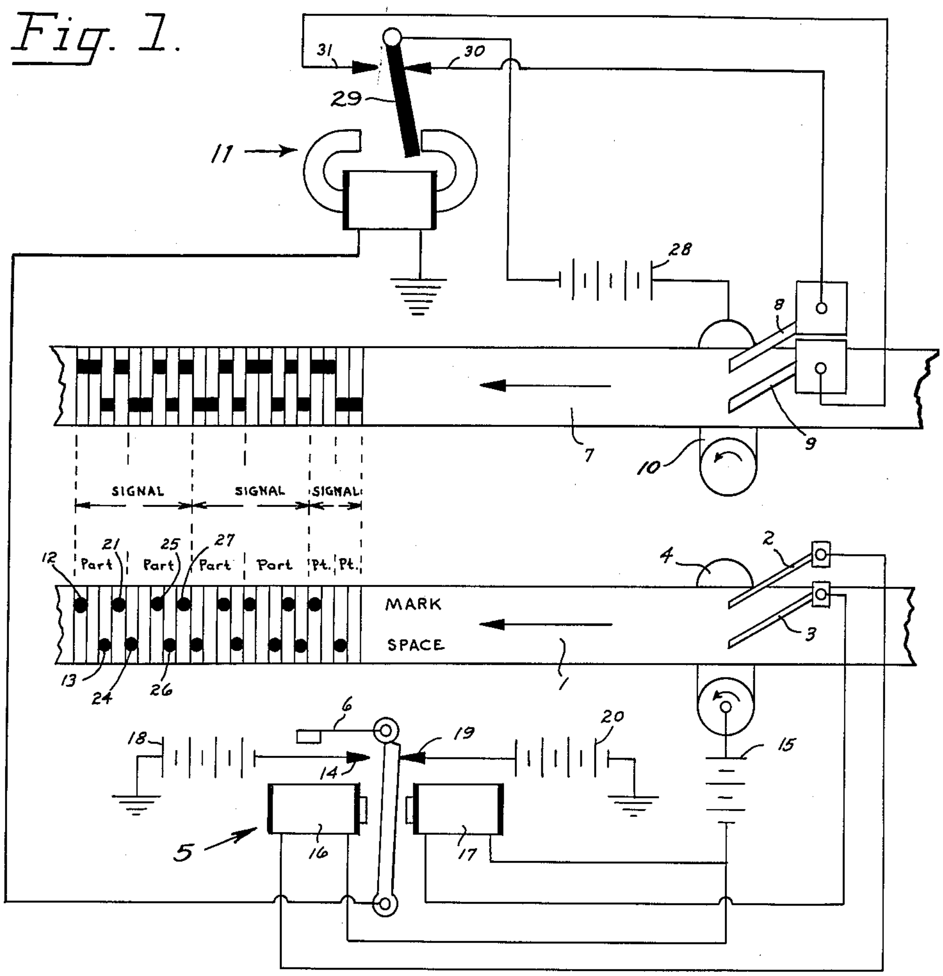
Fig. 1 is a schematic representation of sending and receiving mechanisms adapted to utilize my invention.
Figure 1:
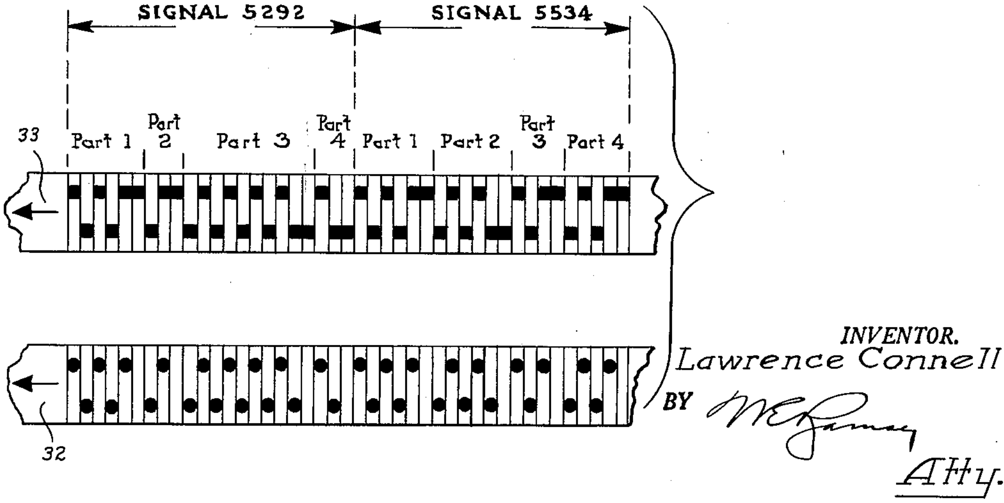

Fig. 1 represents a schematic arrangement of a sending and receiving mechanism to demonstrate further the nature of the code and its handling. 1 designates a piece of tape at the sending station perforated with three signals and assumed to be moving at a uniform speed in the direction of the arrow between contact brushes 2 and 3 and metallic cylinder 4, so that contact is made between a brush and cylinder when a perforation passes under a brush. 5 designates a transmitting relay having a holding force, represented by detent 6, to hold the relay armature against either contact after the armature has been moved into such position by the relay magnets. 7 designates a piece of tape at the receiving station assumed to be chemically dampened for electro-chemical markings when current is passed through it, and moving in direction of arrow at a uniform speed, between contact pens 8 and 9 and metallic cylinder 10. 11 designates a polarised relay acting as the receiving relay.

The operation of the apparatus is as follows: As the tape 1 at the sending station moves under the contact brushes first the brush 2 will make contact with cylinder 4 through perforation 12, moving the armature of transmitting relay 5 to contact 14, by permitting current from battery 15 to flow through magnet coil 16 momentarily. During the following unit of time, as represented by the spaced lines across the tape, the contact brushes will engage no perforation and the armature of relay 5 will continue in engagement with contact 14 under the holding action of detent 6. Thus, line battery 18 will be applied to the line for a time corresponding to the length of perforation 12 and the following blank unit in the tape. This represents a prolongation of the first unit of the signal. The next perforation to engage the contact brushes will be 13 engaging brush 3 for one unit of time, which will cause the armature of relay 5 to move against contact 19 by allowing battery 15 to flow through magnet coil 17, thus applying battery 20 to the line for one unit of time. Then perforation 21 will pass under brush 2, causing the relay armature to engage contact 14 for one unit of time. This completes the sending of the first part of or group of pulses constituting the signal, i. e., one prolonged pulse followed by two short pulses. Without pause, perforation 24 will then pass under brush 3 causing the armature of relay 5 to engage contact 19 for two units of time, followed by perforations 25, 26 and 27 passing under the brushes in succession each for one unit of time and causing the armature of relay 5 to engage contact 14, then 19, then 14 each for one unit of time. This completes the sending of the second part of the signal, i. e., one prolonged pulse followed by three short pulses. The next signal is the same signal as the first, but it starts with a space element instead of a mark element as in the transmission of the first signal, because in my system each signal follows the preceding one without interruption by intervening pulses. The third signal is composed of two pulses, both of which are prolonged. At the receiving station the armature of polarised relay 11 follows the movements of transmitting relay 5, and applies battery 28 alternately to contact pens 8 and 9, accordingly as armature 29 engages contacts 30 or 31. Markings on the tape 7 will be made as shown in accordance with the well understood methods of electro-chemical high speed telegraphy.

32 designates another piece of sending tape, perforated with two signals of a four part alphabet, with the last unit of each part prolonged, and suitable for being transmitted by the sending apparatus above described. 33 designates a piece of received tape with signal markings on it, as it would appear if received on the receiving apparatus above described in response to the sending of tape 32. The signals shown on the tapes consist of four numerals each, 5292 and 5534, which could be used as arbitrary code designations, out of a practically unlimited number of combinations, with prearranged meanings. Each signal is read by the number of units in each part, being considered a numeral.

Figures 2, 5, 7, 8:
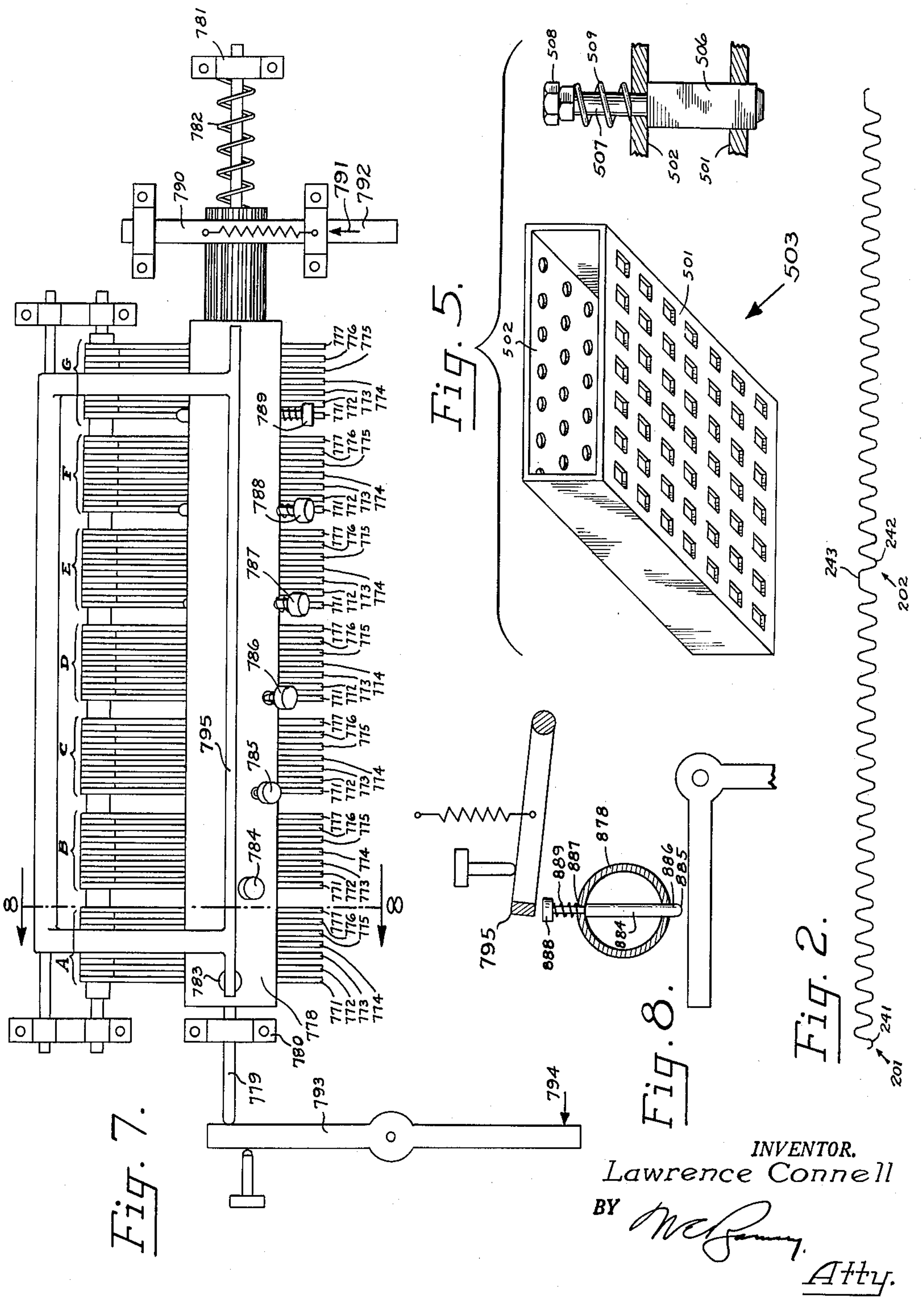
Fig. 2 is a visual representation of the conditions existing in the telegraphic channel while signals embodying my invention pass thereover.
Fig. 5 is a detail view of the several parts of the direct printing mechanism used in connection with a receiver embodying my invention.
Fig. 7 is a modification of a printer adapted for use with my invention.

Fig. 2 designates the near-sine-wave transmission over a circuit of the longest signal which would be used if 1600 signals were provided for. The arrows 201 and 202 point to the pulses where transmission trouble should most likely occur from distortion—at 241 from the prolonged pulse of the preceding signal and at 242 from distortion following the prolonged pulse 243. The balance of the signal would be of pure sine wave characteristics, which is well known to be the most efficient type of electrical transmission. This figure of the drawings is made to give visual form to my contention that with my invention long signals are just as practical to transmit as short ones, if line and apparatus troubles are absent. In fact, a long signal of this nature would have less chance of trouble from capacity and inductance reactances than a number of short signals equaling the long one in total time units, because the group of short signals would depart more times from sine wave characteristics due to the presence of more numerous prolonged pulses.

Figure 3:
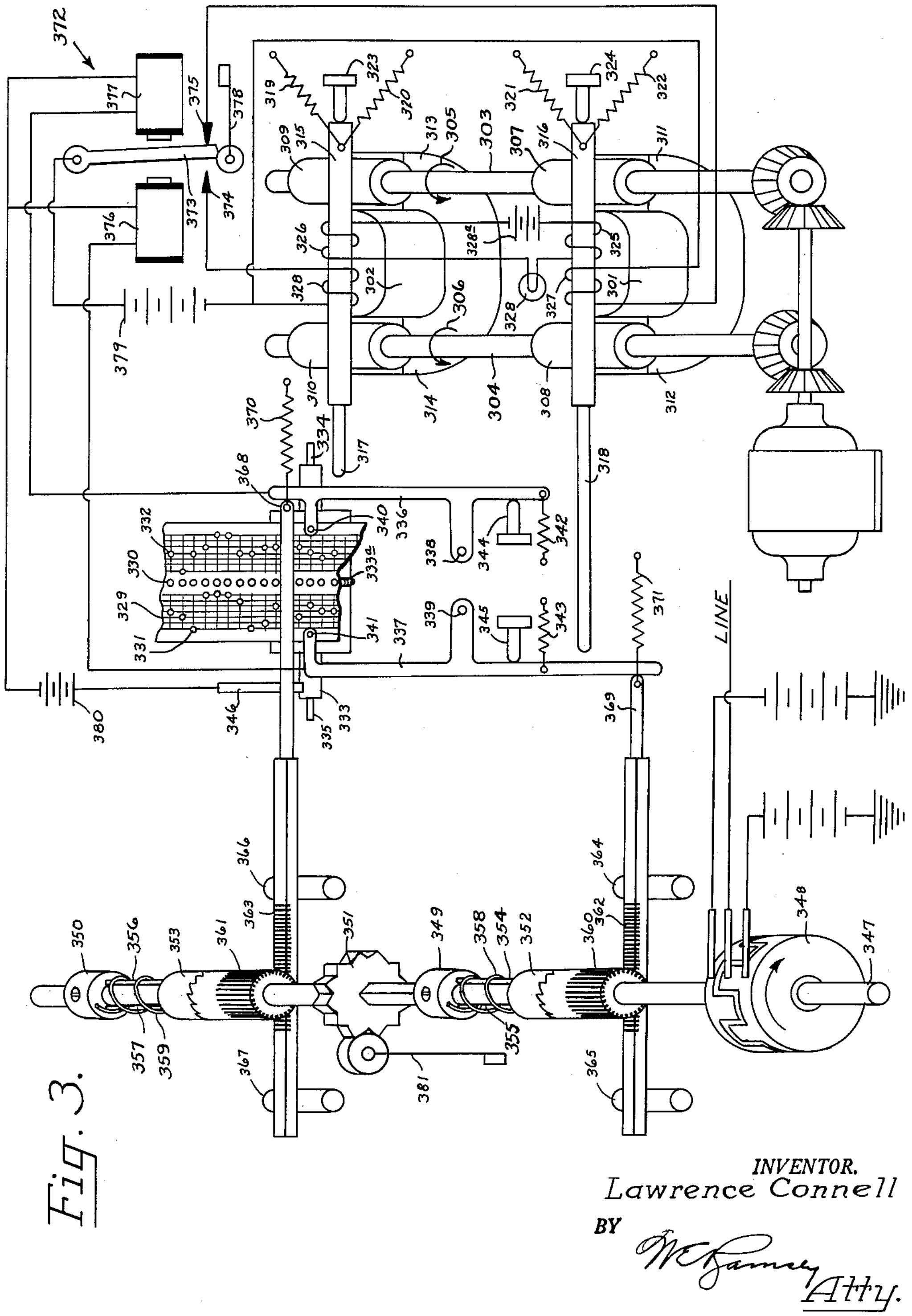
Fig. 3 is a more or less schematic view of sending apparatus embodying my invention.

Fig. 3 represents a general purpose sending apparatus for ordinary telegraph printer operation. 301 and 302 are permanent magnets; 303 and 304 are bronze shafts turning in the direction of arrows 305 and 306 at identical constant speeds and having steel collars 307, 308, 309 and 310 firmly fixed to the shafts and positioned in close proximity to the magnet poles 311, 312, 313 and 314, respectively, of the permanent magnets. 315 and 316 are steel armatures resting on the steel collars of the shafts as shown in the drawing, each carrying at one end insulating extensions 317 and 318, respectively. Retractile springs 319, 320, 321 and 322 move the armatures against adjustable stops 323 and 324 at intervals when the armatures are not subject to a force tending to move them away from said stop. 325 and 326 are coils through which the armatures are free to move lengthwise, in series with each other and with battery 328*a* and resistance 328 in a manner causing the poles of the armatures to oppose the polarity induced in the steel collars by the poles of the permanent magnets. 327 and 328 are coils through which the armatures are free to move lengthwise and said coils are wound in a direction to cause the poles of their respective armatures to coincide with polarities induced by the permanent magnets in the steel shaft collars on which they rest. Said coils 327 and 328 have a number of turns in relation to the current strength with which they may be energized to overcome the effects of coils 325 and 326 and thereby control the polarity of the armatures when energized. A piece of paper tape 329 has a row of feed holes 330, and signal perforations 331, 332 arranged at opposite sides of the center row of feed holes 330. A metallic cylinder 333, upon which the tape rests, is pivoted at 334 and 335. The sprocket teeth 333*a* for moving the tape forward between signals extend from the surface of the cylinder and revolve with the cylinder, one tooth spacing between signals in the usual manner. A pair of contact levers, 336 and 337, respectively, are pivoted at 338 and 339, respectively, and having semi-spherical contact points 340 and 341, respectively, bear lightly on the tape so as to project through the tape when a perforation occurs between a contact point and the cylinder to make electrical contact with the metallic cylinder. Retractile springs 342 and 343, respectively, move levers 336 and 337 against back stops 344 and 345. A brush 346 makes continuous electrical contact between cylinder 333 and battery 380. A shaft 347 carries rigidly mounted commutator 348, insulated from shaft 347, collars 349 and 350, and star wheel 351. Non-reversing jaw clutches 352 and 353 are attached to pins 354, 355, and 356 and 357, respectively. Said pins fit into holes in collars 349 and 350, to keep jaw clutches 352 and 353 from revolving on shaft 347. Compression springs 358 and 359 tend to push jaw clutches 352 and 353, respectively, away from collars 349 and 350, respectively. Pinions 360 and 361 are journalled on the shaft but are held against axial movement thereon, and have jaw faces engaging those on jaw clutches 352 and 353, respectively. Racks 362 and 363 are positioned between rollers 364, 365 and pinion 360, and between rollers 366, 367 and pinion 361 so that the teeth of the racks and their associated pinions will mesh as the racks are moved longitudinally in either direction. The racks have insulated tips at 368 and 369, respectively, where they bear against levers 336 and 337, respectively, and retractile springs 370 and 371 for moving them against said levers.

A control relay 372 comprises armature 373, contacts 374 and 375, magnet 376 (for moving said armature against contact 374), and magnet 377 (for moving it against contact 375). Detent 378 holds the armature against a selected contact during periods of no magnetism.

The operation of the apparatus is as follows:

With the apparatus in the position shown in Fig. 3 the armature of control relay 372 is applying current to coil 327 from battery 379, causing armature 316 to be magnetized in a manner to present attracting poles to steel collars 307 and 308. Armature 316 will move away from stop 324, and will be held against slippage on collars 307 and 308 by magnetic attraction. It will move at the peripheral speed of the contacting polarized collars 307 and 308. When its insulated tip engages contact lever 337 it will push the latter before it, moving contact 341 from the edge of the tape towards the center, and simultaneously will push rack 362, which in turn will revolve pinion 360. The meshing jaw face of pinion 360 will engage the face of jaw clutch 352 during the movement of rack 362, and the shaft 347 will accordingly be revolved. The movements described will continue until contact 341 of contact lever 337 engages a perforation in the tape and as a result makes electrical contact with the metallic cylinder through the perforation. That will energize magnet 376 of relay 372 by applying battery 380 to it, and the armature of relay 372 will be moved against contact 374. Current flowing to coil 327 will thereby be discontinued from battery 379 at contact 375, which will leave coil 325 in control of the magnetizing of armature 316. As coil 325 magnetizes its armature in a direction opposing the polarities of the steel collars on which it rests, its armature will lose all attraction for the revolving collars and will be pulled back against stop 324 by springs 321 and 322. Contact lever 337 will be pulled back against stop 345 by spring 343, and rack 362 will be pulled back against lever 337 by spring 371, turning pinion 360 as it moves but not turning the shaft, because jaw clutch 352 is non-reversing and it will be forced away from the engaging jaw face of said pinion during the movement in this direction and star wheel 351 will maintain the position of the shaft under holding action of detent 381. All parts will resume the positions shown in Fig. 3 except that relay 372 will stand with its armature against contact 374, held there by detent 378. It will be assumed that in the operation above described contact 341 of lever 337 moved five units across the tape before engaging a perforation in the tape; that the rack, pinion and meshing teeth are coordinated in size to give a five tooth revolving movement to shaft 347 by the five unit movement of contact 341, and that the segments of commutator 348 are of a width to allow five segments to pass under the brushes as a result of the movement. The commutator will then have transmitted five pulses of alternate positive and negative battery to the line and will be resting on the segment which is transmitting the fifth pulse, held there by detent 381 bearing on star wheel 351. Assume this to have been the transmission of the first part of the signal, i. e., five pulses, the last one now being prolonged as the commutator is standing at rest. With the relay armature resting on contact 374 the transmission of the second part of the signal will commence. Coil 328 has battery 379 applied to it and will polarize its armature 315 to coincide with the polarity of the steel collars on which it rests. The armature will move towards contact lever 336, and the time it takes to move from its stop to engagement with contact lever 336 represents a lengthening of the last pulse of the first part of the signal, as the shaft an commutator will have remained fixed during that interval. When armature 315 engages contact lever 336 it will start contact 340 moving across the tape. Rack 363 will be moved and will turn pinion 361; pinion 361 will engage jaw clutch 353 and start the commutator revolving again, thereby terminating the prolongation of the last pulse of the first part of the signal and starting the transmission of the pulses representing the second part of the signal. These movements will continue until contact 340 enters a perforation, when it will make contact with the metallic cylinder and apply battery 380 to coil 377 of control relay 372, which will cause the relay armature to move against contact 375 again and the apparatus will resume the positions shown in the drawing, ready to begin the transmission of the first part of the following signal. The last pulse of the second part of the signal just described will be prolonged until armature 316 has moved enough to engage contact lever 337 and to revolve the commutator to the next following segment in transmitting the first part of the following signal. To describe the operation in a more general way: I transmit the first part of a signal by causing the control relay to arrange local circuits to cause the armature of one of the magnetic clutches to operate and to move a contact lever from one edge of the tape toward the center at a predetermined constant speed. Simultaneously a commutator is revolved at a speed geared to the speed of the contact lever, so that for every unit distance the contact lever travels across the tape a segment of the commutator will pass under the line brush and transmit a pulse to the line. The movements continue until the contact point of the contact lever enters a perforation in the tape and makes an electrical contact. This operates the control relay so as to cause the discontinuance of the foregoing movements and allows the foregoing parts to reset themselves under the action of associated springs. The commutator, however, remains stationary with the segment which transmitted the last pulse positioned under the line brush to prolong the transmission of the last pulse. The operation of the control relay, simultaneously with arranging for the resetting of the parts just described, starts the operation of the other magnetic clutch. This first regulates the duration of the prolongation of the last pulse of the first part of the signal by the time used in moving the clutch armature from its back stop to engagement with its associated contact lever. It then causes the commutator to revolve again as said associated contact lever moves its contact point across the tape from the opposite side towards the center, as described for the transmission of the first part of the signal. The control relay operates again when the contact point of this contact lever enters a perforation. This throws the apparatus back into position to start the operation of transmitting the first part of the following signal in the manner described for the transmission of the first part of this signal. The tape moves ahead from one signal to the next during the interval used in prolonging the last pulse of the second part, in the usual manner. The prolongation of either part of the signals can be regulated by adjusting the back stops of the magnetic clutch armatures closer to or farther away from said armatures, thereby increasing or decreasing the time required for the armatures to travel to engagement with the contact levers. It is during these intervals that the commutator remains stationary and continues to transmit to the line continuous current from the segment positioned under the line brush, which in all cases will be the last pulse of a part of a signal.

Figure 4:
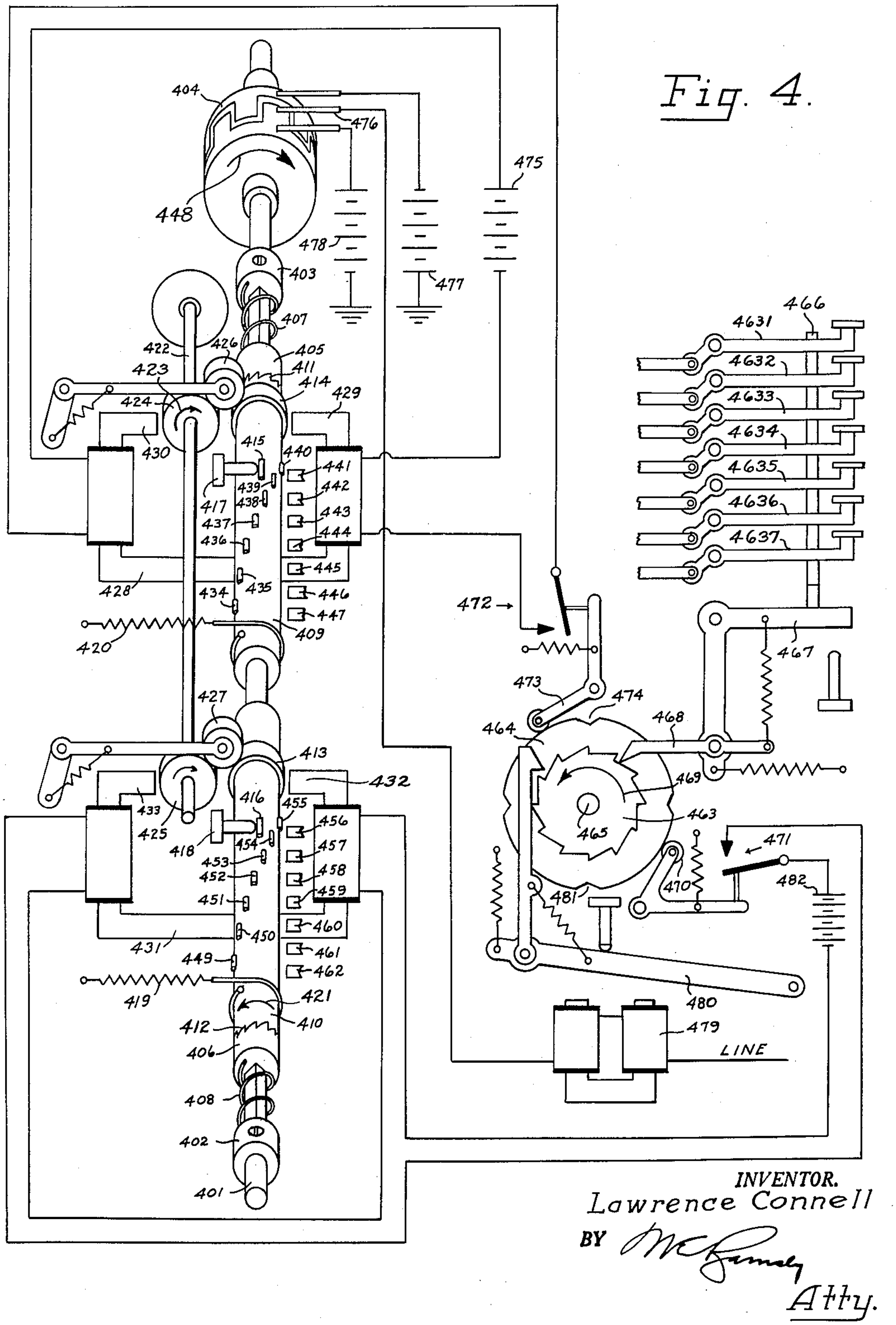
Fig. 4 is a similar schematic illustration of a modified type of sending apparatus for utilizing my invention.

Fig. 4 illustrates a mechanism for direct keyboard transmission by means of an abbreviated keyboard.

A shaft 401 has rigidly fixed collars 402 and 403 and commutator 404 secured thereto, the latter being insulated from the shaft. Meshing gears 405 and 406 are keyed to the shaft but are permitted to slide lengthwise in either direction. Compression springs 407 and 408 tend to force them away from collars 403 and 402, respectively. Light weight cylinders 409 and 410 are journalled on shaft 401 but are held against axial movement thereon. Said cylinders have meshing teeth 411 and 412 formed thereon to mesh with the teeth on the meshing gears against which they engage. Said cylinders are provided with steel collars 413 and 414 shown in drawing; each having a rigid projection 415 and 416, respectively, for stopping their movements in one direction by abutting adjustable stops 417 and 418, respectively. Springs 419 and 420 tend to revolve the cylinders, respectively, both in the direction indicated by arrow 421 on cylinder 410. A non-magnetic shaft 422 rotates at a predetermined constant speed in the direction of arrow 423, and has fixed to it steel collars 424 and 425. A steel wheel 426 bears lightly on collars 414 and 424 to join them together magnetically and forms a part of detent mechanism, which is apparent from the drawing. A similar wheel 427 bears on collars 413 and 425 to connect them magnetically in the same manner. An electromagnet 428 with pole pieces 429 and 430 is positioned to polarize collars 414 and 424, respectively. An electromagnet 431 has pole pieces 432 and 433 positioned to polarize collars 413 and 425 respectively. Fixed stops 434, 435, 436, 437, 438, 439 and 440 project radially from the surface of cylinder 409, and selectably positionable stops 441, 442, 443, 444, 445, 446 and 447 are arranged to be moved into position to engage related stops on cylinder 409 and to stop the rotation thereof in the direction indicated by the arrow 448 on the commutator when a selected stop is moved into the path of an associated stop on the cylinder. Sections of associated transmitting keys 4631, 4632, 4633, 4634, 4635, 4636 and 4637 are indicated in Fig. 4. The depressing of a selected key by an operator moves its associated selected stop into position to engage its associated projecting stop on the cylinder to stop the rotation of the latter. There are seven similar transmitting keys to this group, one for moving each of the stops. This group of transmitting keys is to be operated by the right hand of the sending operator. 449, 450, 451, 452, 453, 454 and 455 are similar projecting stops on cylinder 410; and 456, 457, 458, 459, 460, 461 and 462 are similar engaging stops arranged to be moved into engagement with said projections by the depression of seven other keys (not shown) disposed to be operated by the left hand of the sending operator.

A ratchet wheel 463 and a contact controlling cam 464 are fixed to a common axle 465, and their relative positions are shown in Fig. 4.

The operation of the apparatus is as follows:

To transmit a signal the sending operator depresses one of seven keys with his right hand, representing the number of units in the first part of the signal, and one of the seven keys for the left hand representing the number of units in the second part of the signal. Assume the signal to be one unit in each part. The depression of any key will move a loop 466, which is common to all of the keys of both groups, against lever 467, which carries at its opposite end pawl 468. Said pawl will move ratchet wheel 463 one tooth spacing in the direction of arrow 469, bringing contact detent 470 one tooth spacing nearer to depression 481 on cam 464 and closing spring contact 472 by allowing the detent wheel of contact detent 473 to enter depression 474 of the cam. The closing of spring contact 472 will energize electromagnet 428 by applying current from battery 475 to it. This will cause steel collars 414 and 424 to become magnetized due to their proximity to the poles of the electromagnet, and steel wheel 426 will then complete the magnetic circuit between the steel collars and will strongly engage the surface of each collar. As a consequence it will transmit the revolving movement of collar 424 to collar 414 and start cylinder 409 to revolve in the direction of arrow 448 on the commutator. Teeth 411 of collar 414 will mesh with teeth of meshing gear 405, thereby turning the shaft 401 and with it commutator 404. As the key selected by the operator calls for one unit in the first part of the signal, stop 441 will be positioned in the path of projection 440, and the two will engage when the cylinder has rotated one unit distance. The resulting rotation of the commutator is assumed to be one segment spacing under the line brush 476. The stop 441 should be so adjusted that the commutator will rest with the line brush bearing on the center of a segment when projection 440 engages said stop, and holds the cylinder from rotating further. A shaft 422 continues to revolve, but wheel 426 and collars 424 and 414 slip upon each other in the same way that the plates of a friction disc clutch slip when excessive load is applied. The line current put out by either of the line batteries 477 or 478 through brush 476 passes through the coils of electromagnet 479, which is a slow acting magnet not operable on the fast alternating pulses put out by the commutator when it is revolving. Said electromagnet is strongly operable on the lengthened pulses which result when the commutator is stopped. Consequently magnet 479 will act after stop 441 has discontinued the commutator's movement momentarily, and will move its armature 480 to turn ratchet wheel 463 another tooth distance in the direction of the arrow 469, which will position detent contact 473 on the high surface of cam 464, and open contact 472, thereby demagnetizing electromagnet 428, which will permit spring 420 to return cylinder 409 to its starting position. It will also simultaneously cause the wheel of detent 470 to move into depression 481, closing contact 471, which will cause electromagnet 431 to be energized by battery 482. This will start cylinder 410 revolving to transmit the second part of the signal. When cylinder projection 455 engages stop 456, representing one unit, it will have moved the commutator one segment width and have stopped it with that segment under line brush 476. The apparatus will remain in that position until slow acting electromagnet 479 operates to move its armature 480 and move ratchet wheel 463 another tooth spacing. This will move the detent contacts into the exact positions shown in the drawing and permit the commutator to remain stationary on the segment to which it was moved by the transmission of the pulse representing the second part of the signal. The apparatus will remain in that position until another pair of keys are struck by the sending operator for the following signal, except that stops 441 and 456 will be moved to reset position by springs or other devices. Thus the transmission of the signal above described consisted of one pulse for the first part, automatically controlled as to elongation by the slowness of electromagnet 479 to act, and one pulse for the second part similarly elongated except that the latter elongation will continue until a new signal is struck by the sending operator.

Assume that the next signal comprises two seven-unit groups. A key will be struck by the sending operator with the right hand moving stop 447 into the path of projection 434, and a key with the left hand will move stop 462 into the path of projection 449, after which the operation of the apparatus will be the same as described for the first signal, except that commutator 404 will revolve seven segments distance for the first part of the signal and come to rest with the seventh segment under the line brush for elongation as described. The commutator will then revolve seven more segments for the transmission of the second part of the signal and come to rest on the seventh segment for elongation thereof, and maintain that final position until another pair of keys are struck by the sending operator.

While the above specification describes a polar transmission from the commutator to the line, it should be understood that polar transmission is not necessary over the line. A polar relay can be operated by the circuit extension marked "line" and the contacts and armature of the polar relay can act as a transmitter for either polar or single line transmission. In fact, polar transmission off the commutator is not necessary. Current and no current alternating pulses can be transmitted direct to the line without a transmitting relay by disconnecting one of the line batteries 477 or 478 from the commutator and putting control relay electromagnet 479 in a local polar circuit controlled by armature and front and back contacts of a single relay in series with the line. Or the center brush and one outside brush of the commutator can be inserted in series with a "single" line at an intermediate point and electromagnet 479 operated as in the sentence preceding. This is mentioned because it is believed that this mechanism and form of transmission would operate as efficiently as Morse or Continental on single circuits which were designed for Morse or Continental operation and which may have numerous relays in series with the line at intermediate stations. My signals are composed of short pulses of mark and space, and longer pulses of both mark and space. Morse and Continental are composed of exactly the same elements, namely, "dots" and "spaces" separating them which are identical with my short pulses, and "dashes" and "long spaces" which are identical to my elongated pulses of mark and space. It should also be pointed out that while the mechanism described has only seven keys for each hand and is therefore capable of only 49 signals, it would increase the complexity of the machine very little if, for reasons of secrecy of transmission, another row of seven keys for the right hand and seven for the left hand were added together with necessary stops and cylinder projections, to provide transmission of 196 signals without other changes in the mechanism. Or, two more rows to provide for 441 signals, or three more rows to provide for 784 signals, etc.

Fig. 5 illustrates a type holder comprising bottom plate 501, punched with seven rows of seven square holes. Top plate 502 has seven rows of seven smaller round holes, and the entire assembly takes the form shown as 503. Each of the forty-nine type elements 506 has a square section at the type face end to engage the square holes of bottom plate 501 so as to hold the type bar in alignment. Said square section extends to the bottom of the top plate 502. A smaller rounded stem 507 extends out of the upper end of the square section to move freely through the holes of the top plate 502. A head 508 is formed at the top, so that compression spring 509 can be inserted between the head and the top plate to hold the square part of each of the type bar elements normally against the under side of the top plate and to return them to that position after a selected type element has been moved into printing position by a blow struck upon the head of the type element.

Figure 6:
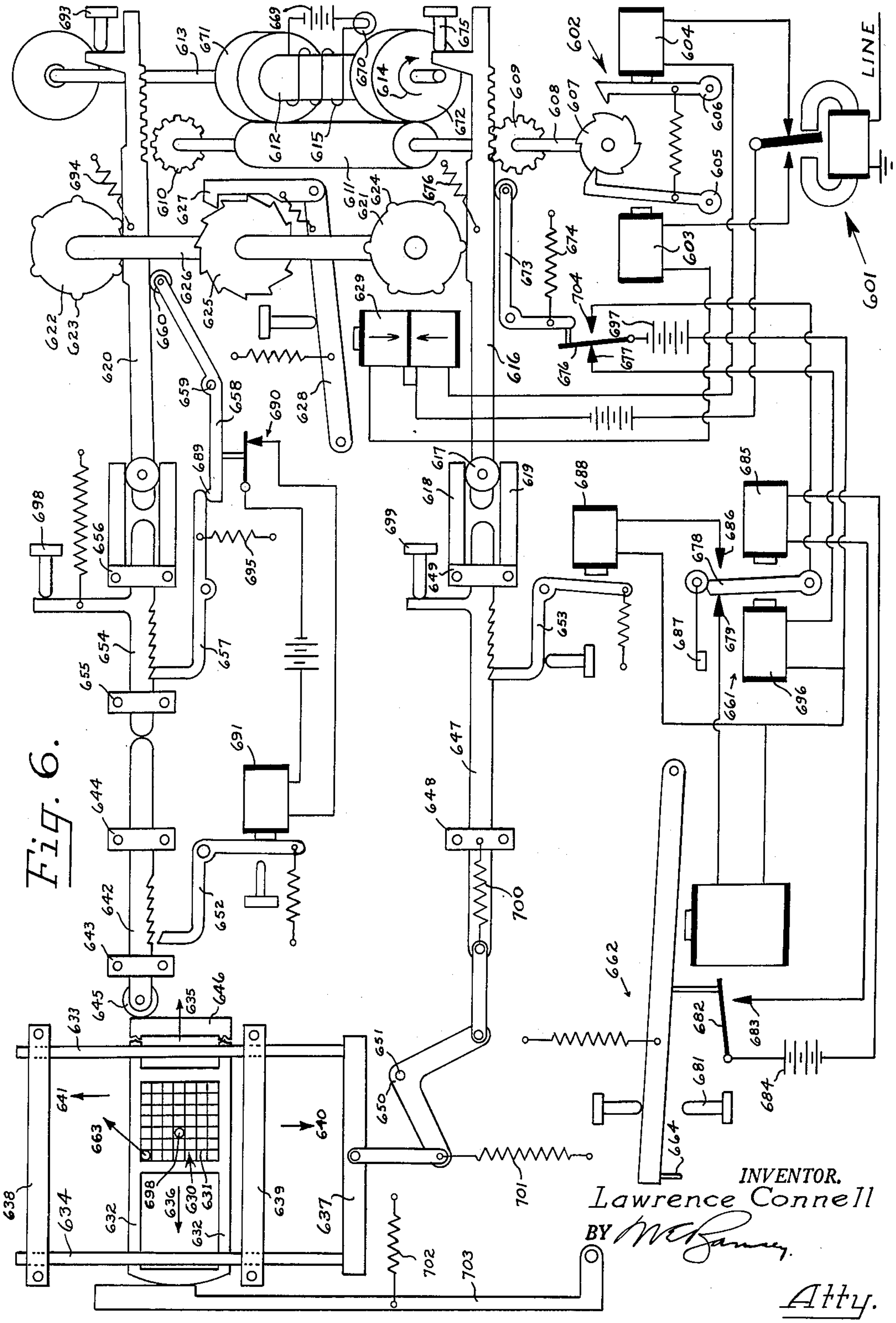
Fig. 6 is a schematic showing of a receiving printer adapted for operation with my invention.

Fig. 6 illustrates schematically a receiving printer, in which the apparatus resets itself from the printing of the preceding signal during the selection of the present signal. 601 represents the receiving relay. 602 represents an escapement relay consisting of quick acting magnets 603 and 604 and armatures 605 and 606. An escapement wheel 607 is mounted on axle 608, said axle also carrying pinions 609 and 610 and steel cylinder 611, the latter bearing against the circumference of steel spool 612 which is fixed to axle 613 and is assumed to be revolving at a uniform speed in the direction of arrow 614. A stationary coil 615 for magnetizing spool 612 is arranged so that spool 612 revolves inside said coil. A selector rack 616 has teeth at one end for engaging the teeth of pinion 609, and a small wheel 617 at the opposite end disposed to move in guide plates 618 and 619 permits longitudinal movement only to rack 616 at the guide plate end of said rack. A similar selector rack 620 is positioned to be moved by pinion 610.

Depressing cams 621 and 622 have projections 624 and 623 thereon which bear upon racks 616 and 620, respectively, when said cams are revolved into the proper positions. Said projections force said racks into engagement with pinions 609 and 610, respectively. A ratchet wheel 625 fixed to axle 626 functions to revolve said depressing cams one tooth spacing of the ratchet wheel at a time through pawl 627 when armature 628 is attracted towards slow acting electromagnet 629. A typing unit 630 consisting of type holder 631 is of the general type illustrated in Fig. 5. Holder 632 to which said type holder is rigidly attached slides freely through guide slots in rods 633 and 634 in the direction of arrows 635 and 636. Rods 633 and 634 with connecting yoke piece 637 constitute another sliding holder movable through guide slots in stationary plates 638 and 639, for moving sliding holder 632 and with it type holder 631 in the direction of arrows 640 or 641. A rack 642 is movable lengthwise in either direction through stationary guide forms 643 and 644, and carries roller wheel 645 at one end. Said wheel bears against yoke piece 646 of sliding holder 632. A rack 647 is movable lengthwise in either direction through stationary guide forms 648 and 649, and joins one end of bell crank lever 650 which is pivoted at 651. Electromagnetically controlled latches 652 and 653 are positioned to engage the teeth of racks 642 and 647, respectively, as shown in the drawing. A floating rack 654 is movable lengthwise in stationary guide forms 655 and 656. A latch 657 is positioned to engage the teeth of said floating rack as is shown in the drawing. A compound lever 658 is pivoted at 659, one end of which bears against a projection of latch 657 as shown in the drawing, and the other end carries roller wheel 660 which bears against rack 620, as is shown in the drawing. A control relay 661 functions to control the printing of the signal and the resetting of the apparatus. A striker device 662, assumed to be positioned above the type holder and in close proximity therewith, has a striking tip 664 that will hit upon the top of the selected type element occupying the position in typeholder 631 which is designated by the dot under arrow 663.

The operation of the apparatus is as follow: Steel spool 612 revolves inside of winding 615, and when energized by battery 669 in circuit with resistance 670 it constitutes a revolving electromagnet with pole pieces 671 and 672 attracting steel cylinder 611; and as said spool revolves (by means not shown) in the direction of arrow 614 it revolves cylinder 611 with it in the opposite direction, due to the attraction of the surface of the cylinder to the surface of the pole pieces of the spool, the combination constituting a magnetic clutch. The strength of the attracting force is such that when either of the armatures of escapement relay 602 is positioned in the path of a tooth on escapement wheel 607 it will stop the movement of said wheel. Then spool 612 will continue to revolve, its pole pieces sliding on the surface of cylinder 611. Escapement relay 602 is a non-polarized device, one magnet and associated armature of which operates on mark pulses from the line through line relay 601, and the other magnet and associated armature operates on the space pulses from the line, the operation as a whole being similar to escapement mechanism operations well known in ticker systems. The ratchet-controlling magnet 629 is a slow acting magnet with differential windings disposed to magnetize its core in one direction by a mark pulse and in the opposite direction by a space pulse, one coil being in series with the coil of magnet 603 of escapement relay 602 and the other coil in series with the coil of magnet 604 of escapement relay 602. The behavior of manget 629 is identical with the operations of the "press magnets" of the ticker systems, in that it will remain passive during the passage of the short pulses through its coils but will operate on the prolonged pulses of the signals. The operation of the apparatus thus far is, therefore, that cylinder 611 will revolve a distance of one half tooth spacing of escapement wheel 607 for every pulse from the line, turning pinions 609 and 610 with it, and pawl 627 will operate once on each prolonged pulse to turn ratchet wheel 625 one tooth spacing at the end of the first part and the end of the second part of each signal. The actual printing is accomplished during the prolongation of the last pulse of the second part of a signal by striking device 662 which is assumed to be positioned so that its striking tip 664 is directly above the square in the type holder designated by the arrow 663. The signal in that square is one unit of the first part and one unit of the second part. The striking device moves in a fixed path and the type holder is selectably adjusted with respect to said path, moving in the direction of arrow 636 by the units of the first part of the signal and in the direction of arrow 641 by the units of the second part of the signal. Thus, if the type holder is moved two units in the direction of arrow 636 from its total "reset" position shown in drawing, in response to reception of three pulses from the line representing the first part of a signal, and then three units in the direction of arrow 641 in response to the reception of four units from the line representing the second part of a signal, the final position attained by the type holder will place the square 698 directly beneath striking tip 664 of the striking device, and the striking device will operate to print that character located therein. When in the total reset position shown in drawing, the type holder is in the position represented by one unit of the first part and one unit of the second part of a signal, i. e., it does not move to attain the one unit position in either direction. The selection of the first part of a signal is accomplished by selector rack 620 pushing type holder 631 in the direction of arrow 636 one unit distance for each pulse in that part of the signal except the first. The prolonged pulse of the last part of the preceding signal will have operated pawl 627 to turn ratchet wheel 625 one tooth spacing, bringing a projection of depressing cam 622 directly above said selector rack and causing it to engage the teeth of pinion 610. Then, as the pulses of the first part of the present signal come in, selector rack 620 will move towards the type holder one unit spacing for each pulse of that part of the signal. The first unit travel will bring selector rack 620 into engagement with floating rack 654, when the latter is in the total reset position shown in drawing, against its back stop 698. Floating rack 654 may not necessarily be in that position, as will be explained later. The succeeding movements of selector rack 620 will then move type holder 631 in the direction of arrow 636 one unit spacing for each pulse received from the line. Latch 657 will be held away from the teeth of floating rack 654 by lever 658 during this operation, and latch 652 will bear against the teeth of rack 642, due to contact 690 being open. The prolongation of the last pulse of the first part of the signal will cause depressing cam 622 to be turned another unit space, as described before, into the position shown in drawing, which will cause selector rack 620 to be moved out of engagement with pinion 610 by spring 695 of latch 657 operating upon it through lever 658. This will allow spring 694 to reset selector latch 620 against back stop 693. Latch 657 will move to engage a tooth of floating rack 654, simultaneously with the movement of lever 658. Magnet 691 of rack 652 will be energized by the closing of contact 690 and will hold latch 652 away from the teeth of rack 642. The apparatus will remain in that position until the prolongation of the last pulse of the second part of the signal, during which interval selector rack 616 with its associated apparatus will be selecting the second part of the signal. The prolongation of the last pulse of the first part of the signal places selector rack 616 in the position shown in the drawing. The movement of selector rack 616 resulting from the reception of the first pulse of the second part of the signal will move it into engagement with rack 647, and succeeding pulses from the line will cause rack 647 to move compound lever 650 before it, resulting in the type holder being moved in the direction of arrow 641, one unit spacing for each pulse of the second part of the signal except the first pulse. Latch magnet 688 will be de-energized during this operation, due to contact 686 being open, and latch 653 will consequently be bearing against the teeth of rack 647 and will fall in behind the tooth above it when selector rack 616 discontinues its pushing movement. This leaves the entire apparatus in position for the printing of the signal selected and for the resetting of selector rack 616 and associated parts, including control relay 661 and striking device 662, which are electrically controlled by selector rack 616. The position of the various parts at the commencement of the prolongation of the last pulse of the second part of the signal are: Latch 657 is holding floating rack 654 in the position to which it was moved by selector rack 620. Latch 652 is held away from the teeth of rack 642 by magnet 691. Latch 653 has entered a tooth of rack 647. Armature 678 of control relay 661 is against contact 679 which closes the circuit to the magnet of striking device 662, except that said circuit is open at contact 704, controlled by the contact end of lever 673. The full prolongation of the last part of the second part of the signal will now occur and cause ratchet wheel 625 to be operated again, and the resulting movements of depressing cams 621 and 622 will cause the following actions: selector rack 620 will be moved into engagement with pinion 610, moving lever 658 upon its axis which will open spring contact 690 and move latch 657 out of engagement with the teeth of floating rack 654, allowing said floating rack to move towards reset position. Coil 691 will be de-energized by the opening of contact 690 and will permit latch 652 to enter the tooth of rack 642 which is directly above it, thus maintaining the position of the type holder which was previously being maintained by latch 657 and floating rack 654. Selector rack 616 will disengage from pinion 609 under the force of spring 674 of lever 673, and will reset against stop 675 under the pull of spring 676. Contact 677 will be opened, de-energizing magnet 696 of control relay 661, but the armature of said relay will remain against contact 679, being held by detent 687. Contact 704—676 will be closed, applying battery 697 to the magnet of striking device 662 and the latter will print the character selected by the signal, as before described. It will also close momentarily spring contact 682 against contact 683, which will apply battery 684 to magnet 685 of control relay 661, causing armature 678 to move against contact 686 which will open the energizing circuit of the magnet of striking device 662 and allow it to return to the reset position shown in the drawing and will energize magnet 688 which in turn will disengage latch 653 from the teeth of rack 647 and allow said rack to reset against stop 699 by the force of springs 700 and 701, which will move the type holder and lever 650 into the reset positions. The entire apparatus will now be in the reset positions, ready for the selection of the first part of the following signal by selector rack 620 and associated parts, except that latch 652 will be holding rack 642, and with it type holder 631, in the position selected by the first part of the signal just described. Those parts will remain in set position during the selection of the first part of the following signal, except that if the first part of said following signal consists of a greater number of units than the signal just finished floating rack 654 will pick up rack 642 after selector rack 620 has moved the number of units in the first part of the signal just finished. It also will push rack 642 ahead of it for the remainder of the units in the first part of said following signal. Latch 657 will fall in behind a tooth of floating rack 654 during the prolongation of the last pulse of the first part of said following signal and will remain in that position during the second part of the signal, while latch 652 will be disengaged from the teeth of latch 642 and allow the latter to drop back against floating rack 654 if floating latch 654 was not moved into engagement with latch 642 during the selection of the first part of the signal. The purpose of floating rack 654 is to provide a light member for resetting against selector rack 620, during the period in which selector rack 620 may be moving in the opposite direction, whereas the resetting of the heavier type holder and rack 642 by spring 702 of lever 703 against selector rack 620 while the latter is moving for the selection of part of a signal might interrupt the movement of the latter. This arrangement is not necessary for the resetting of the apparatus concerned in the selection of the second part of the signals, because they have the duration of the first part of a signal in which to reset.

Fig. 7 designates part of a selecting device, suitable to operate a typewriter, preferably an electric typewriter, as a receiving printer, with all the upper and lower case characters and functions of a standard keyboard typewriter available.

The key levers of a typewriter would be replaced with straight levers, as the seven groups of levers each numbered 771, 772, 773, 774, 775, 776, 777 in the drawing, and bracketed under groups A, B, C, D, E, F, G at the opposite ends. Above these key levers is mounted a light metal cylinder 778 on shaft 779, held in position in stationary forms 780 and 781 so that it can be easily revolved or moved lengthwise in either direction. It has a pinion on one end of slightly longer length than the width of one of the seven groups of key levers. A compression spring 782 bears against the pinion at one end and fixed form 781 at the other end for moving said shaft and cylinder lengthwise into the position shown in the drawing after it has been moved in the opposite direction in a manner to be explained later.

783, 784, 785, 786, 787, 788 and 789 designate the heads of seven striking pins, held in said cylinder in a manner illustrated in Fig. 8. A section 878 of the cylinder, and the striking pin 884, having a small diameter striking point 885, are shown. A larger body 886 passes through the lower side of the cylinder, and a smaller diameter extension 887 passes through the upper side of the cylinder. A striking head 888 is of slightly larger diameter, and a compression spring 889 encircles extension 887 lying between the upper outside surface of cylinder 878 and striking head 888, operating to return the striking pin to the position shown in the drawing after it has been displaced downward by impact.

Referring again to Fig. 7: The striking pins all pass diametrically through the cylinder, and are arranged in spiral pattern lengthwise of the cylinder. Thus when striking pin 783 is in a perpendicular position through the cylinder, pin 784 will be angularly arranged so that a unit movement of rack 790 in the direction of arrow 791 will rotate the cylinder one unit and move pin 784 into the perpendicular position. A movement of said rack of two units distance will move pin 785 into the perpendicular position. Movements of the rack of three, four, five and six units distance will move pins 786, 787, 788 and 789, respectively, into the perpendicular position. When in the perpendicular position the striking heads of said pins will align with blade 795 positioned over said cylinder. Only one pin can be struck at a time by the striking blade 795 because when one pin is in the perpendicular position, all the other pins are one side or the the other of perpendicular. The pins are all positioned, when the apparatus is in the reset position as shown in the drawing, so that their striking points are directly over the number 771 key levers of each of the several groups, but only pin 783 is in the perpendicular position, and if the striking blade were operated, it would engage striking pin 783 and cause key 771 of group A to be depressed. And, if the cylinder were moved lengthwise, away from form 780, one unit movement would place the striking pin above key lever 772, two units movement would place said pin above key lever 773, etc. If the cylinder were revolved one unit distance in the direction of arrow 791, it would place striking pin 784 in position to strike key 771 of group B. If the cylinder were then moved lengthwise for one unit from the position shown in the drawing, striking pin 784 would hit key lever 772 of group B, and if moved six units distance lengthwise would hit key lever 777 of group B. Therefore, the number of units in the first part of a signal would, by causing rack 790 to revolve the cylinder one unit distance for each pulse except the first pulse in the direction of arrow 791, determine which of the seven groups of key levers would be positioned under a perpendicular striking pin; and the movements of one unit distance lengthwise for each unit in the second part of a signal except the first unit would determine which of the seven key levers in the group selected would be directly under the striking pin selected by the first part of the signal. This apparatus is intended to be used in connection with the apparatus shown in Fig. 6, and takes the place of typeholder 631. The revolving movements of the cylinder would be controlled by positioning the tip of rack 642 of Fig. 6 to bear against the end 792 of rack 790 of Fig. 7 and to push said rack 790 in the direction of arrow 791 in Fig. 7.

Rack 647 of Fig. 6 would be positioned to push against lever 793 of Fig. 7 at the point shown by arrow 794 of Fig. 7. Striking device 662 of Fig. 6 would be arranged to strike blade 795 of Fig. 7, instead of striking a type element in typeholder 631 of Fig. 6. Otherwise the apparatus and operation pertaining to Fig. 6 would apply to the operation of the apparatus shown in Fig. 7.

I claim:

1. In telegraphic apparatus having a single transmission channel, signal formulating means operatively joined to said single channel, said signal formulating means including plural selectors with means for reciprocating the same alternately across an encoded member to trace and to define a signal made up of alternate pulses arranged in plural related groups, the length of each reciprocal movement being correlated to and indicative of the number of alternate pulses in each said group.

2. In telegraphic apparatus having a single transmission channel, an elongated plural section tape movable step by step in a longitudinal direction and defining a plural group signal indicator, plural signal formulating apparatuses including means sequentially reciprocable laterally across the respective plural sections of said tape to translate the indicated plural group signal into a sequential mechanical movement, and transmitting mechanism operatively joined to said single transmission channel and responsive to said mechanical movement to transmit the plural signal groups sequentially in continuous uninterrupted succession over the single transmission channel.

3. In telegraphic message transmission apparatus having a single transmission channel, plural signal formulating means sequentially operable to combine plural related groups of a signal into a continuous, uninterrupted signal, transmitting mechanism operatively joined to said formulating means and said single channel to send said groups continuously one after the other and in succession over said single channel with but two differing and alternating elements, and receiving mechanism joined to said single channel to receive and to separate said continuous transmission into said plural related groups, every part of the signal thus sent and received forming a part of the telegraphic message proper.

4. In telegraphic apparatus having a single transmission channel for sending symbols formed in separate halves, two correlated signal formulating means operable alternately to combine two separate halves of a symbol into a sequential two part signal, transmitting mechanism joined to said single channel and responsive to said two formulating means to send plural numbers of said two part signals over said single channel continuously one after the other without interruption or break with but two differening elements which alternate one with another, receiving mechanism joined to said single channel to receive said continuous transmission and to reseparate the same into two part signals, and a coordinate type printing mechanism movable along two perpendicular axes in response to the respective two signal parts of said receiving mechanism to record the signal.

5. In telegraphic apparatus having a single transmission channel, signal formulating and transmitting means for arranging and sending plural related signal groups successively over said single channel, said means including a tape feeding device for moving a tape step-by-step along a path, said tape carrying a plurality of spaces of unit lateral width, and a laterally extending selector member including means for reciprocating the same laterally across said path and over one or more of said unit width spaces while the tape is at rest, the number of unit spaces covered by said selector member during a reciprocation being determinative of the length of the corresponding signal group.

6. In telegraphic apparatus having a single transmission channel, signal formulating means for transmitting a signal made up of plural related groups, transmitting mechanism for arranging and sending said groups in succession over said single channel, said transmitting mechanism including a tape feeding device for moving a tape step-by-step along a path, a pair of laterally extending selector members arranged one on each side of said tape, and means for reciprocating said members laterally across said path alternately from both sides thereof.

References Cited in the file of this patent

UNITED STATES PATENTS

| | | |
|---|---|---|
| Re. 18,746 | Furrer | Feb. 21, 1933 |
| 316,698 | Hoevenberg | Apr. 28, 1885 |
| 1,419,256 | Hammond | June 13, 1922 |
| 1,462,875 | Stoddard | July 24, 1923 |
| 1,709,031 | McCoy | Apr. 16, 1929 |
| 1,941,916 | Rothermel | Jan. 2, 1934 |
| 2,010,158 | Kleinschmidt | Aug. 6, 1935 |
| 2,013,671 | Roe | Sept. 10, 1935 |
| 2,110,149 | Rugh | Mar. 8, 1938 |
| 2,210,571 | Doty | Aug. 6, 1940 |
| 2,275,017 | McNaney | Mar. 3, 1942 |
| 2,354,733 | Baldwin | Aug. 1, 1944 |
| 2,375,383 | Potts | May 8, 1945 |
| 2,403,280 | Hicks | July 2, 1946 |
| 2,425,307 | Desch | Aug. 12, 1947 |
| 2,531,868 | Ackel | Nov. 28, 1950 |
| 2,536,228 | Ruysdael et al. | Jan. 2, 1951 |
| 2,609,452 | Hansen | Sept. 2, 1952 |